United States Patent
Wagner

(10) Patent No.: US 12,127,908 B2
(45) Date of Patent: Oct. 29, 2024

(54) SELF-LIGATING BRACKET FOR ORTHODONTICS

(71) Applicant: Bernhard Foerster GmbH, Pforzheim (DE)

(72) Inventor: Carsten Wagner, Bretten (DE)

(73) Assignee: Bernhard Foerster GmbH, Pforzheim (DE)

( * ) Notice: Subject to any disclaimer, the term of this patent is extended or adjusted under 35 U.S.C. 154(b) by 558 days.

(21) Appl. No.: 17/247,396

(22) Filed: Dec. 9, 2020

(65) Prior Publication Data

US 2021/0177550 A1 Jun. 17, 2021

(30) Foreign Application Priority Data

Dec. 16, 2019 (DE) .................. 10 2019 134 575.8

(51) Int. Cl.
A61C 7/14 (2006.01)
A61C 7/28 (2006.01)

(52) U.S. Cl.
CPC .............. *A61C 7/145* (2013.01); *A61C 7/287* (2013.01)

(58) Field of Classification Search
CPC .................................. A61C 7/287; A61C 7/73
See application file for complete search history.

(56) References Cited

U.S. PATENT DOCUMENTS

| | | | | |
|---|---|---|---|---|
| 5,322,435 A | * | 6/1994 | Pletcher | A61C 7/145 433/10 |
| 7,255,557 B2 | | 8/2007 | Foerster | |
| 2001/0005574 A1 | * | 6/2001 | Manemann | A61C 7/287 433/11 |
| 2007/0248928 A1 | | 10/2007 | Damon | |
| 2009/0325120 A1 | | 12/2009 | Lewis et al. | |
| 2010/0062387 A1 | | 3/2010 | Hilliard | |
| 2013/0236847 A1 | * | 9/2013 | Shin | A61C 7/16 433/9 |
| 2014/0141383 A1 | * | 5/2014 | Hagelganz | A61C 7/287 433/9 |
| 2017/0014208 A1 | | 1/2017 | Falcone et al. | |

FOREIGN PATENT DOCUMENTS

| | | | |
|---|---|---|---|
| CN | 103 340 691 A | 10/2013 | |
| CN | 205083675 U | * 3/2016 | ............ A61C 7/30 |
| DE | 10 2004 056 168 A1 | 6/2006 | |
| DE | 10 2005 056 184 A1 | 6/2006 | |
| KR | 20180127123 A | 11/2018 | |

OTHER PUBLICATIONS

Machine translation of CN 205083675 (Year: 2016).*

* cited by examiner

*Primary Examiner* — Heidi M Eide
(74) *Attorney, Agent, or Firm* — Orbit IP, LLP

(57) ABSTRACT

A self-ligating bracket for orthodontics includes a resilient clamp, wherein a first clamp leg is inserted in a slit and can be moved therein between a closed and open position to prevent an unintended loss of the clamp. The first clamp leg has at least one oblong recess, into which protrudes a projection that proceeds from the lingually or labially situated surface of the slit. The recess is bordered on its end facing away from the clamp bend by a stop, which hits the projection in the open position of the clamp and limits a further movement of the clamp. The surface situated opposite the projection forms an escape space inside of the slit, into which the first clamp leg escapes with the stop under a resilient deformation when the stop slides over the projection during insertion of the clamp.

16 Claims, 15 Drawing Sheets

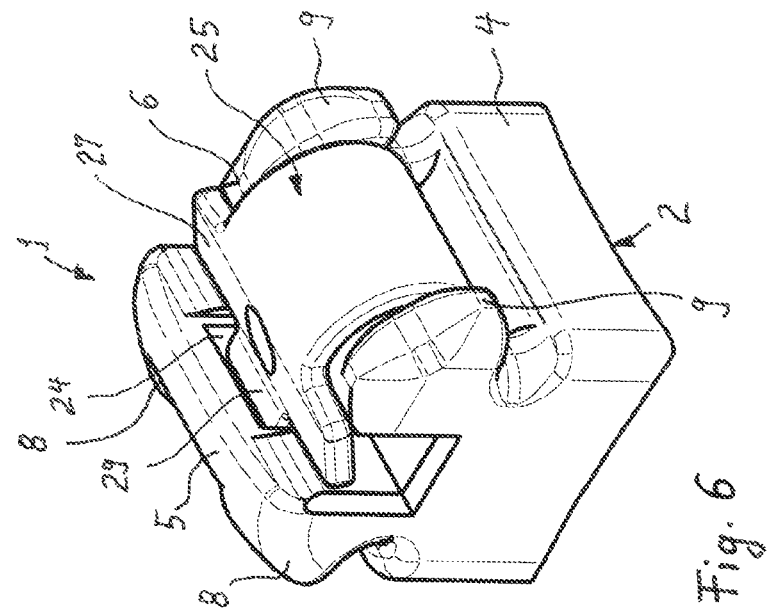
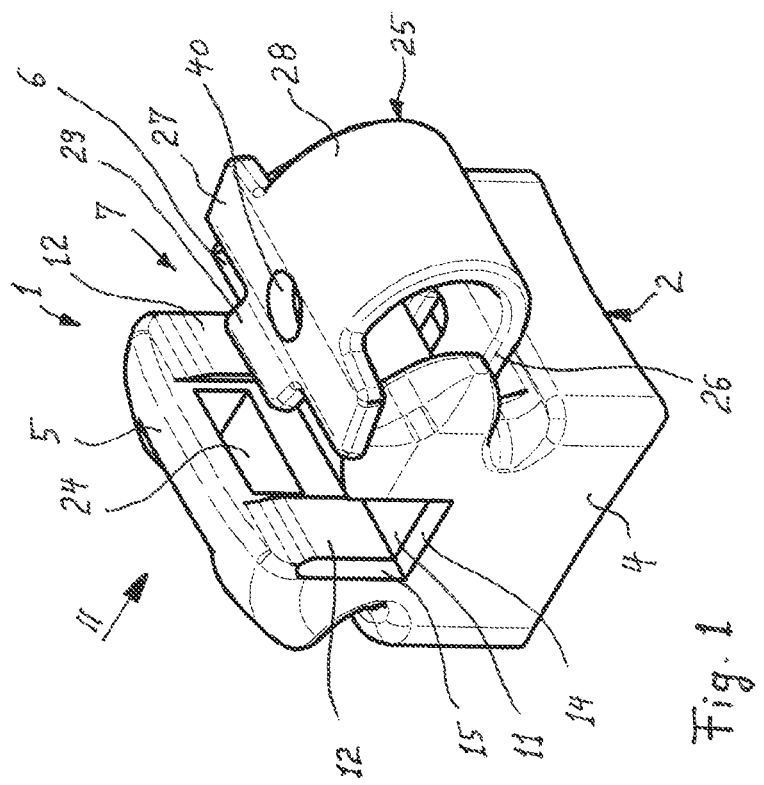

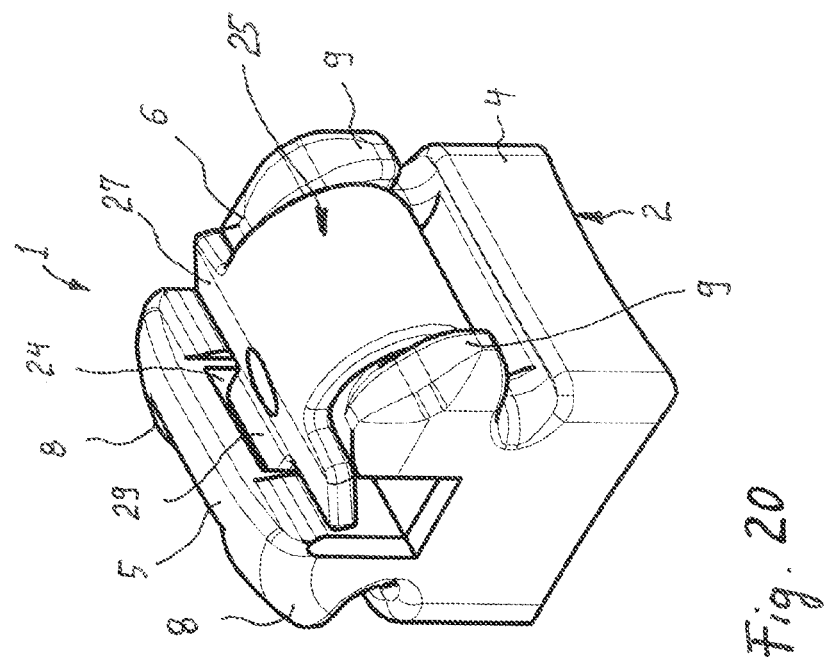
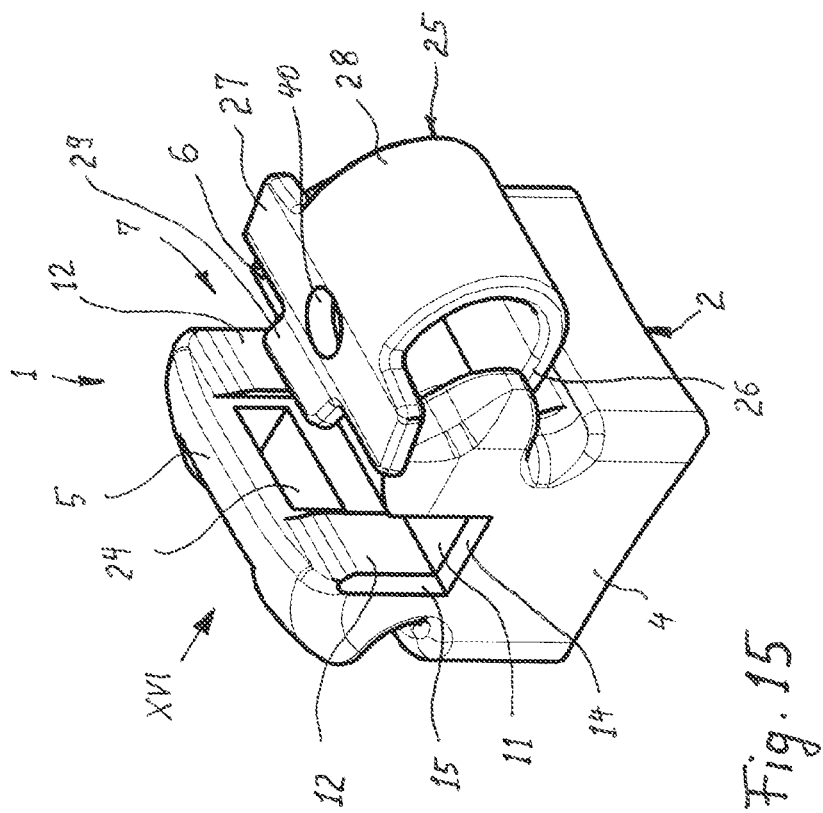

SELF-LIGATING BRACKET FOR ORTHODONTICS

CROSS-REFERENCE TO RELATED APPLICATIONS

This application claims priority to German patent application 10 2019 134 575.8 filed on Dec. 16, 2019, the content of which is fully incorporated herein by this reference.

DESCRIPTION

Field of the Invention

The invention proceeds from a self-ligating bracket for orthodontics comprising a socket base having a socket, an occlusal wall that extends from the socket base, a gingival wall that extends from the socket base, a groove, which separates the occlusal wall and the gingival wall from each other, and extends continuously in the mesial to distal direction, a fastening side facing away from the groove for adhesively bonding the bracket to a lingual or vestibular surface of a tooth, a slit, which extends in the gingival to occlusal direction, and is bordered by a lingually situated surface and by a labially situated surface, and a resilient clamp, which has a first clamp leg and a second clamp leg that are connected with each other by an occlusally or gingivally arranged clamp bend. The first clamp leg is inserted in the slit between the lingually situated surface and the labially situated surface, and can be moved therein in a gingival-occlusal direction between a closed position and an open position of the clamp, wherein the first clamp leg is set up in such a way as to prevent an unintended loss of the clamp.

Background of the Invention

For example, such brackets are known from DE 10 2004 056 168 B4 and DE 10 2005 056 184 B4. In these brackets, a tongue directed against the occlusal wall is cut out of a labial clamp leg, and bent in a labial direction so as to include an acute angle with the lingual clamp leg. The labial surface bordering the slit is further removed or interrupted in the area of the gingival wall and in the area of the groove, so that the tongue can be pressed down by introducing a tool into the groove from a labial direction. The tongue directed against the occlusal wall prevents the clamp from inadvertently sliding out of the slit in its open position and being lost. Brackets in which the clamp leg moveable in the slit is set up in such a way as to prevent the clamp from slipping out of the slit in its open position have proven themselves in practice time and again. Manufacturing a clamp with such a bent tongue is difficult, and can be associated with relatively high production tolerances, because the materials with a good resilience that are well suited for achieving a high elasticity for the chamber are usually hard to plastically deform.

US 2010/0062387 A1 discloses a bracket of a different type, which has a lifting element between the labial surface of the bracket and the labial leg of the clamp. The lifting element can be turned, so as to labially lift the labial clamp leg in the closed position of the clamp, and thereby limit the forces that the clamp exerts on the archwire. To this end, the lifting element can be provided with a thread or a cam disk mechanism. The lifting element has a cylindrical head, which has a slit, and sits in an oblong hole of the labial clamp leg, so as to allow the lifting element to be set from outside. At the same time, the length of the oblong hole in the labial clamp leg limits the displacement path of the clamp between its closed position and open position. Contaminants and food particles can very easily get stuck in the oblong hole and the lifting element, and even become compacted by the chewing process. Such food particles are practically impossible to remove with the usual toothbrushing methods. This can block a displacement of the clamp in its open position.

US 2009/0325120 A1 discloses a bracket of yet another different type. This bracket is a purely passive bracket without a clamp, but has a slider displaceable on a dovetail guide in the gingival-occlusal direction, which extends up to the gingival wall in its closed position, and exposes the groove in its open position. The socket has an integral ramp-shaped projection, which interacts with latching contours on the slider, and limits its displacement in the occlusal direction in its open position. The ramp-shaped projection and/or the latching contours of the slider are flexible enough to ensure a latching effect in the open position and closed position. As a consequence, such a bracket cannot be fabricated out of inflexible materials, such as ceramics.

SUMMARY OF THE INVENTION

An object of the present invention for a bracket of the kind mentioned at the outset is to improve and simplify clamp manufacture.

This object is achieved by a bracket with the features indicated in claim 1. Advantageous refinements of the invention are the subject of dependent claims.

The self-ligating bracket for orthodontics according to the invention has a socket base having a socket, an occlusal wall that proceeds from the socket base, a gingival wall that proceeds from the socket base, and a groove, which separates the occlusal wall and the gingival wall from each other, and extends continuously in the mesial to distal direction. The side of the bracket facing away from the groove is referred to as the fastening side, which is designed to be adhesively bonded to a tooth. The fastening side of the bracket according to the invention can be adhesively bonded to a lingual or a vestibular surface of the tooth. The groove is also referred to as "slot". It is used to receive an archwire, which usually leads through a sequence of brackets that are fastened to a row of teeth lying one next to the other. Pulling and/or twisting can generate a prestress in the wire, which is conveyed by the archwire to the brackets, and from the latter to one or several teeth, so as to change their position.

The bracket has a slit, which extends in the gingival to occlusal direction, and is bordered by a lingually situated guiding surface and by a labially situated guiding surface. The bracket further has a resilient clamp, which has a first clamp leg and a second clamp leg that are connected with each other by a bent section. This bent section is referred to as a clamp bend, and can be arranged occlusally or gingivally, depending on the orientation in which the bracket is adhesively bonded to the surface of the tooth. In a bracket whose fastening side is intended to be adhesively bonded onto a vestibular surface of a tooth, the first clamp leg is also referred to as a lingual leg, and the second clamp leg as a labial leg. The first clamp leg has a longitudinal direction that runs in the gingival-occlusal direction, and also extends in a plane. The first clamp leg is inserted in the slit between the lingually situated surface and the labially situated surface, and can be moved therein in a gingival-occlusal direction between a closed position and an open position of the clamp. When the clamp is moved from gingival to occlusal for opening purposes, the clamp bend is occlusally arranged. In the closed position of the clamp, the second clamp leg then extends until into a cutout in the gingival wall. In the open position of the clamp, the tip of the second clamp leg rests on the occlusal wall, so that an archwire can be inserted into the groove or removed from the groove. In the closed position, the second clamp leg closes the groove and resiliently abuts against the archwire, so as to press it against the base of the groove. Therefore, such a bracket is referred to as an "active bracket". In a case where the archwire exerts a force on the second clamp leg that exceeds the restoring force of the clamp, the recess in the gingival wall can be bordered by a stop, which the second clamp leg hits when the archwire acts on the second clamp leg with a high enough force. The stop thus limits the distance of the second clamp leg from the base of the groove. The stop in the gingival wall further limits the largest possible size of the archwire in the lingual-labial direction. It can alternatively also be provided that the clamp be displaced from occlusal to gingival for opening purposes. In such a case, the clamp bend is gingivally arranged, and the second clamp leg extends until into a cutout of the occlusal wall in the closed position, while its tip rests on the gingival wall in the open position.

Given an occlusally arranged clamp bend, the clamp can be held in its closed position because the second clamp leg is sprung against the occlusal wall in the closed position, and can only be moved out of the closed position into the open position by being elastically bent up. Given a gingivally arranged clamp bend, the second clamp leg is sprung against the gingival wall.

The first clamp leg of the bracket according to the invention is set up in such a way as to prevent an unintended loss of the clamp during interaction with other parts of the bracket. The first clamp leg has at least one oblong recess, into which protrudes a projection that proceeds from the lingually or labially situated surface of the slit. The recess in the first clamp leg extends in the gingival-occlusal direction, and is bordered on its end facing away from the clamp bend by a stop, which hits the projection in the open position of the clamp and limits a further movement of the clamp. As a result, the clamp cannot be occlusally or gingivally moved beyond its open position in the direction of the clamp bend. There is a limit on how much the first clamp leg can be pushed out of the slit, so that the clamp cannot fall out of the slit.

The surface situated opposite the projection forms an escape space inside of the slit, into which the first clamp leg escapes with the stop under a resilient deformation when the stop slides over the projection during insertion of the clamp into the slit. The surface lying opposite the projection is here formed in such a way as to yield an escape space, in particular in the region lying opposite the projection. For example, the escape space can take the form of a cavity, recess, depression, pocket, or channel. If the projection proceeds from the labially situated surface of the slit, it protrudes in the lingual direction into the recess of the first clamp leg. If the first clamp leg reaches the projection during insertion, the clamp leg is resiliently deformed in a lingual direction, and escapes into the escape space, which is formed in the lingually situated surface of the slit. By escaping in this way, the stop glides over the projection without the projection deforming. The projection can be inflexible. In the escaping process, the first clamp leg is bent around a line that runs along its plane of extension.

The invention has significant advantages:
The first clamp leg in conjunction with the projection present inside of the slit reliably prevents an unintended loss of the clamp when it is transferred from the closed position into the open position. The first clamp leg is prevented from unintendedly slipping out of the slit.
Clamp manufacture is substantially simplified. The clamp no longer needs to be plastically deformed to prevent it from slipping out.
The oblong recess in the first clamp leg can be manufactured very easily by punching, for example an oblong hole or an edge area of the leg.
As a result, the clamp can be manufactured with a much greater precision and less manufacturing tolerances.
Apart from the resilient clamp, the bracket can be manufactured out of an inflexible material, which is practically impossible to resiliently deform, for example ceramics. Only the clamp is elastically deformed when inserting the first clamp leg into the slit.
The projection and the escape space arranged opposite it can be easily formed within this slit, in particular if the bracket is molded in one piece, in particular via metal injection molding (MIM) or sintering out of ceramic.

In a further embodiment of the invention, the surface of the slit lying opposite the projection may contain at least one flat guiding surface for the first clamp leg. The surface that borders the slit, and from which the projection extends, may contain a flat guiding surface for the first clamp leg, in particular be designed as a flat guiding surface. The surface from which the projection extends may be completely flat. The guiding surfaces in the lingually situated surface and in the labially situated surface of the slit may run parallel to each other. This can ensure a good guidance of the first clamp leg.

The side of the projection within the slit facing the clamp bend may run inclined to the guiding surface from which the projection proceeds, in particular at an angle of 15° to 25°. This makes it easier for the stop to slide over the projection while inserting the first clamp leg into the slit, and escape during resilient deformation. The side of the projection facing away from the clamp bend may be inclined more strongly toward the guiding surface than its side facing the clamp bend. This causes the first clamp leg to latch in, and provides a good safeguard against undesired loss.

In another embodiment, the fastening side of the bracket may have a widened base, whose width as measured in a mesial to distal and/or gingival to occlusal direction is greater than the corresponding width of the socket. Such a widened base is also referred to as a "pad", and can enlarge the area on the fastening side available for adhesively bonding the bracket, thereby improving the adhesion of the bracket to the tooth. The fastening side may also be provided with structures, for example undercut projections in an alternating orientation, which result in a distinctly better adhesion of the bracket to the tooth while adhesively bonding the bracket with a tooth. In brackets made out of metal, the base may also be manufactured separately, and only connected with the socket of the bracket after the fact via welding. The occlusal wall may have a ligature wing or even several ligature wings. The gingival wall may have at least one gingival ligature wing. Ligature wires can be secured to ligature wings in a manner known in the art.

The slit in which the first clamp leg is inserted may run transverse to the groove, in particular perpendicularly to the groove. In particular, the slit may extend continuously through the socket base. As an alternative, the slit may be closed on the side of the bracket facing away from the clamp bend, wherein in particular the gingival side of the bracket may here be involved. The slit may run in the socket base between the groove and the fastening side of the bracket. In particular, the base of the groove may run continuously without interruption from mesial to distal. Then there exists no passage between the slit and the groove. This can make it easier to manufacture the bracket, in particular a one-piece bracket. The bracket has less free spaces inside, which can become clogged with deposits.

The surface bordering the slit on the side of the first clamp leg facing away from the groove may protrude over the free end of the first clamp leg in each position of the clamp. The "free end" is understood as the end of the clamp leg facing away from the clamp bend. A positioning aid for a tool may be provided at the free end and/or before the free end of the first clamp leg, with which the clamp can be moved from the closed position into the open position by pressing against the free end of its first clamp leg. Such a positioning aid does not weaken the clamp and its restoring force. Moreover, the first clamp leg cannot escape when pressure is exerted on its free end, because it is guided along a straight line in the slit in which it is inserted. A channel extending from gingival to occlusal may be provided in the socket base as the positioning aid, which ends at a stop that is covered by an end of the first clamp leg when the clamp is in its closed position. However, alternatively or additionally the second clamp leg may have a hole into which a pin-shaped tool can engage in order to move the clamp out of its closed position into its open position.

In a first variant of the bracket according to the invention the first clamp leg may have a central recess. In particular, the latter may be designed as an oblong hole that extends in the longitudinal direction of the first clamp leg. The end of the oblong hole facing away from the clamp bend may comprise the stop for the projection proceeding from the socket base. An oblong hole in the first clamp leg can be manufactured very easily. The escape space may be provided by a channel in the surface of the slit situated opposite the projection. The channel extends from gingival to occlusal, in particular over the entire length of the slit. The channel may be arranged between two flat guiding surfaces for the first clamp leg. The surface of the slit lying opposite the projection thus contains two guiding surfaces, which extend along the mesial or distal edge of the first clamp leg. As a result, very good guidance can be ensured for the first clamp leg in the slit. If it is intended that such a bracket be fastened on a vestibular surface of a tooth, in particular the lingually situated surface of the slit can contain the channel and the two guiding surfaces, which extend mesially and distally next to the channel along the edges of the first clamp leg.

In a second variant of a bracket according to the invention, the first clamp leg may each have a recess on its mesial edge and on its distal edge. Each of the recesses is bordered by a stop at its end facing away from the clamp bend. A projection proceeding from the lingually or labially situated surface of the slit protrudes into each of the recesses. An escape space is formed in the slit opposite each projection. Each escape space may be provided by a respective channel in the surface of the slit lying opposite the projection. The channels may extend from gingival to occlusal, in particular over the entire length of the slit. The flat guiding surface in the surface of the slit lying opposite the projection may be arranged between the two channels.

In the first and second variants of the bracket according to the invention, the line around which the first clamp leg is bent while yielding to the projection during insertion of the clamp into the slit under a resilient deformation is a line that runs along the longitudinal direction of the first clamp leg.

In a third variant of the bracket according to the invention, the escape space may be comprised of a pocket in the surface of the slit that is opposite the projection. The pocket extends from gingival to occlusal, in particular over the entire width of the first clamp leg and/or the slit. The line around which the first clamp leg is bent as it yields to the projection during insertion of the clamp into the slit under a resilient deformation is here a line, which runs transverse to the longitudinal direction of the first clamp leg.

In another embodiment of the bracket, the groove may have inclined surfaces and/or rounded areas at its distal end and at its mesial end. Two ribs may be provided in the groove on the wall facing away from the clamp bend. The ribs may be on the gingival wall and extend in the lingual-labial direction. The ribs may have chamfered or rounded edges. The ribs make it possible to very easily vary the width of the slit measured in the gingival-occlusal direction while manufacturing the bracket. The clamp—in particular the first clamp leg—can have a rounded edge.

BRIEF DESCRIPTION OF THE DRAWINGS

Additional details and advantages of the invention are disclosed in the following description of several illustrative embodiments in conjunction with the attached figures:

FIG. 1 is a perspective view of a first embodiment of a bracket according to the invention with a clamp in the open position;

FIG. 6 shows the bracket of FIG. 1 in a view corresponding to the latter, wherein the clamp is in the closed position;

FIG. 15 is a perspective view of a second embodiment of the bracket according to the invention with a clamp in the open position;

FIG. 20 shows the bracket of FIG. 15 in a view corresponding to the latter, wherein the clamp is in the closed position;

DETAILED DESCRIPTION OF THE PREFERRED EMBODIMENTS

Figure 4:
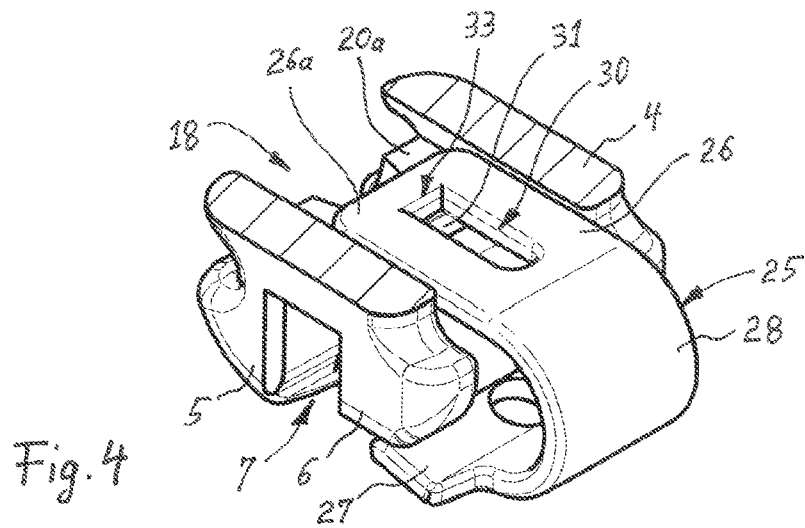
FIG. 4 is an oblique view of the bracket cut along the cut surface IV-IV in FIG. 3.
Figure 3:
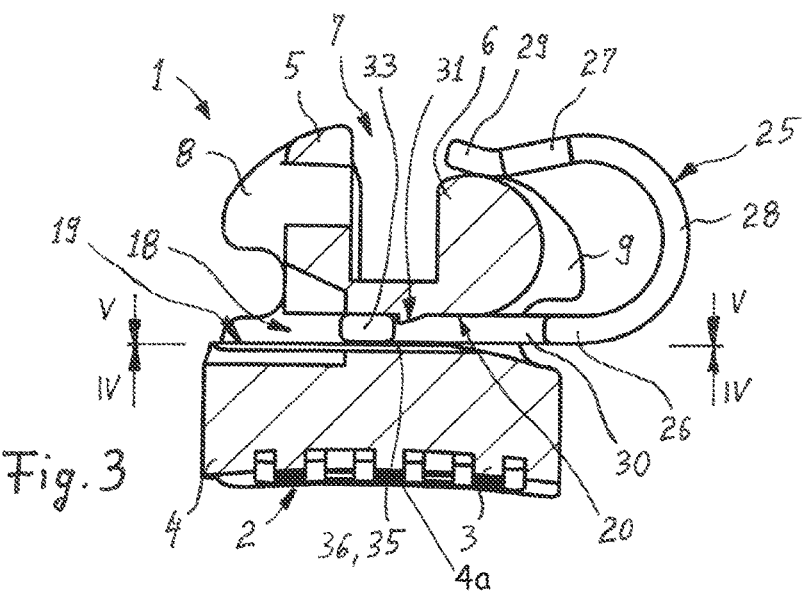
FIG. 3 is a view of the bracket cut along the cut surface III-III in FIG. 2.
Figure 2:
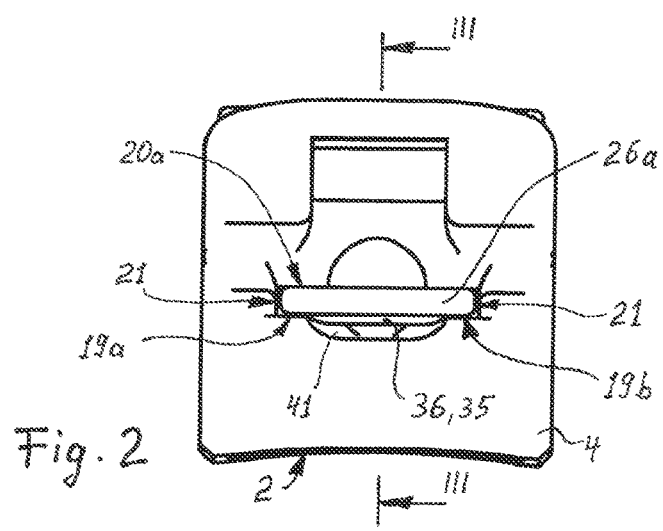
FIG. 2 is a view of the bracket in the direction of arrow II in FIG. 1.
Figure 5:
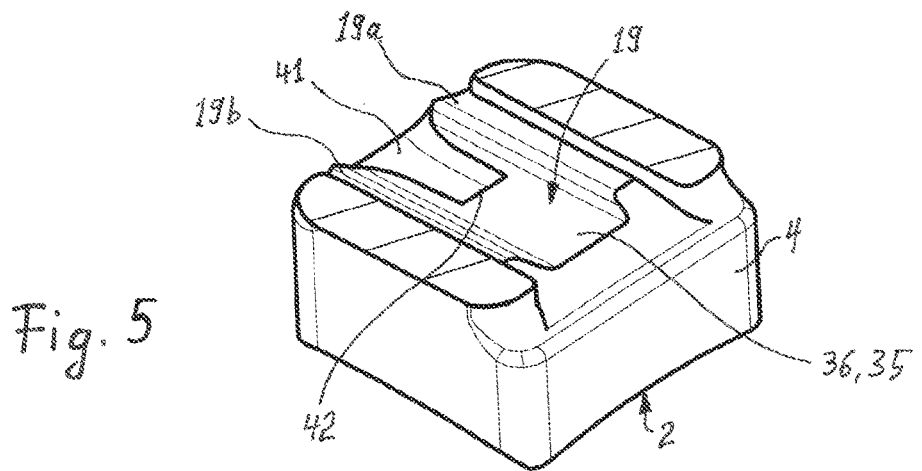
FIG. 5 is an oblique view of the bracket cut along the cut surface V-V in FIG. 3.
Figure 7:
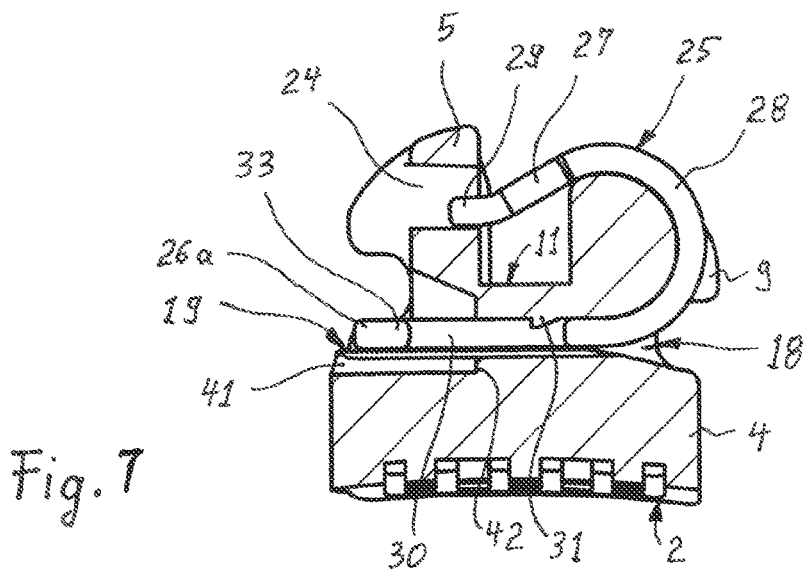
FIG. 7 shows the bracket according to FIG. 6 in a view corresponding to FIG. 3.
Figure 14:
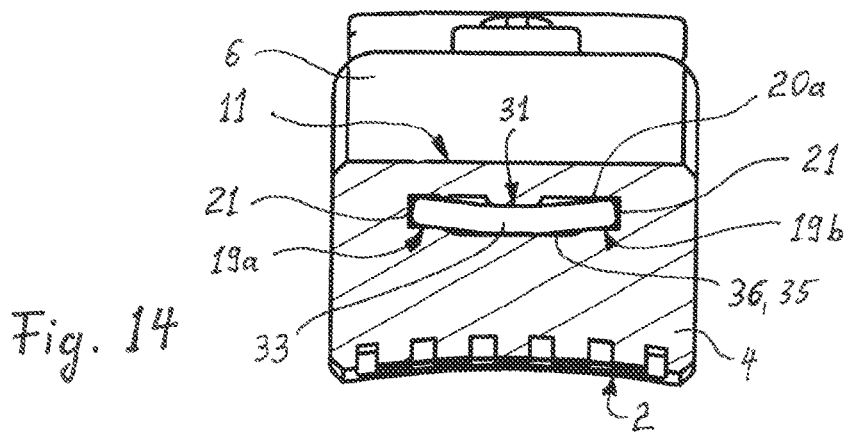
FIG. 14 is a view of the bracket cut along the cut surface XIV-XIV in FIG. 11.
Figure 10:
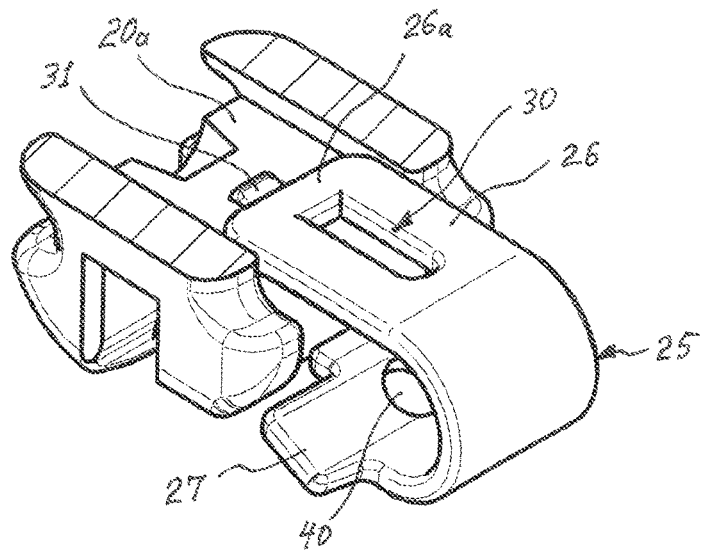
FIG. 10 shows the bracket according to FIG. 8 in a view corresponding to FIG. 4.
Figure 8:
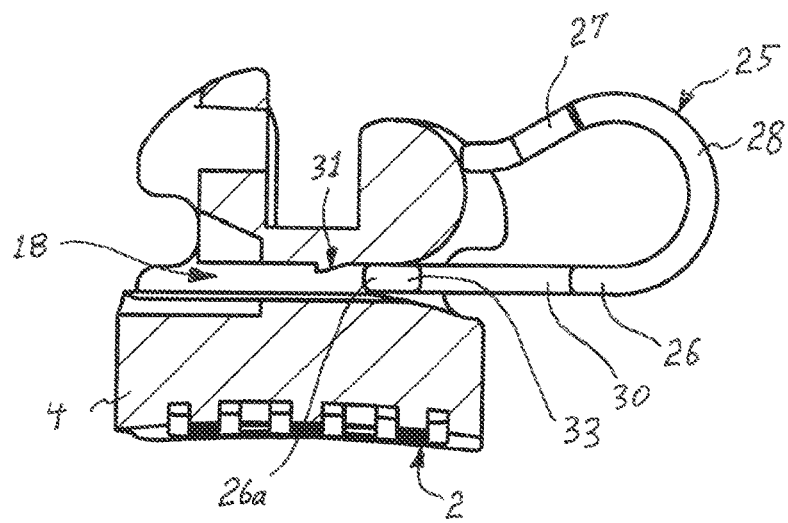
FIG. 8 shows the bracket of FIG. 3 in a view corresponding to the latter, wherein the clamp has not yet been inserted.
Figure 9:
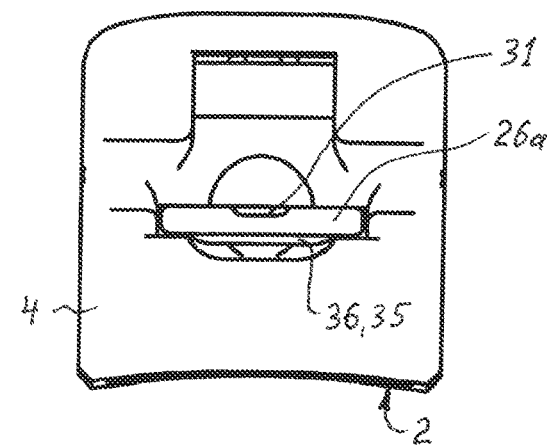
FIG. 9 shows the bracket according to FIG. 8 in a view corresponding to FIG. 2.
Figure 13:
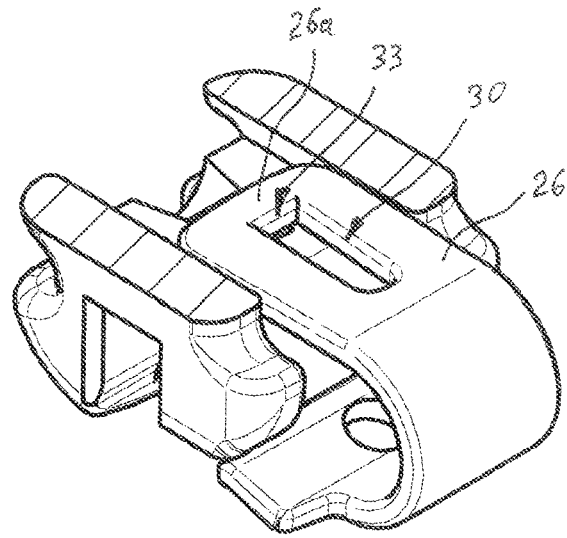
FIG. 13 shows the bracket according to FIG. 11 in a view corresponding to FIG. 4.
Figure 11:
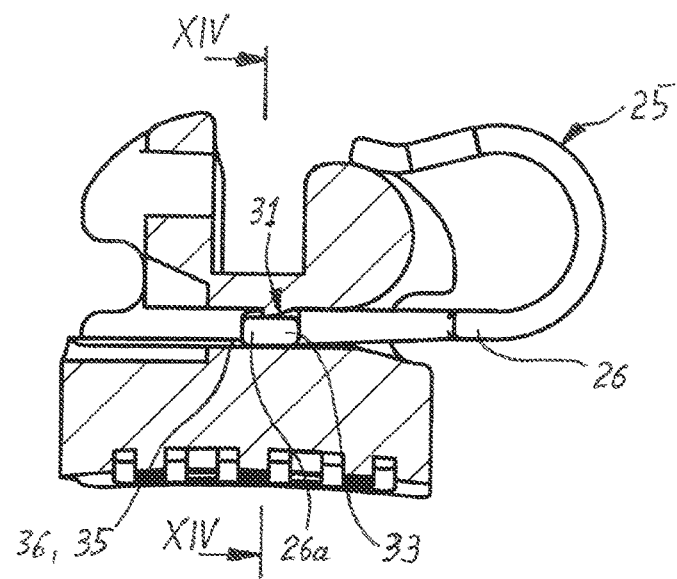
FIG. 11 shows the bracket of FIG. 3 in a view corresponding to the latter, wherein the clamp is partially inserted.
Figure 12:
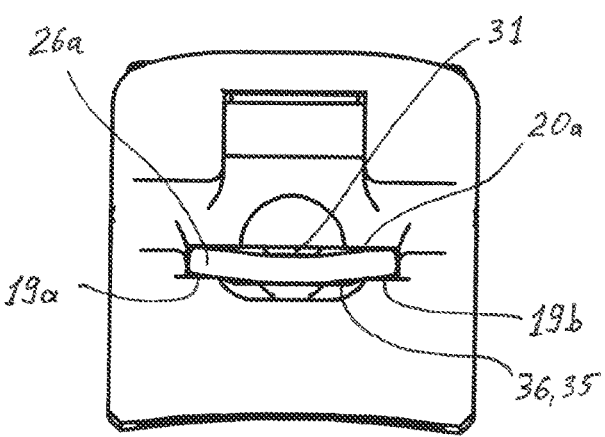
FIG. 12 shows the bracket according to FIG. 11 in a view corresponding to FIG. 2.
Figure 18:
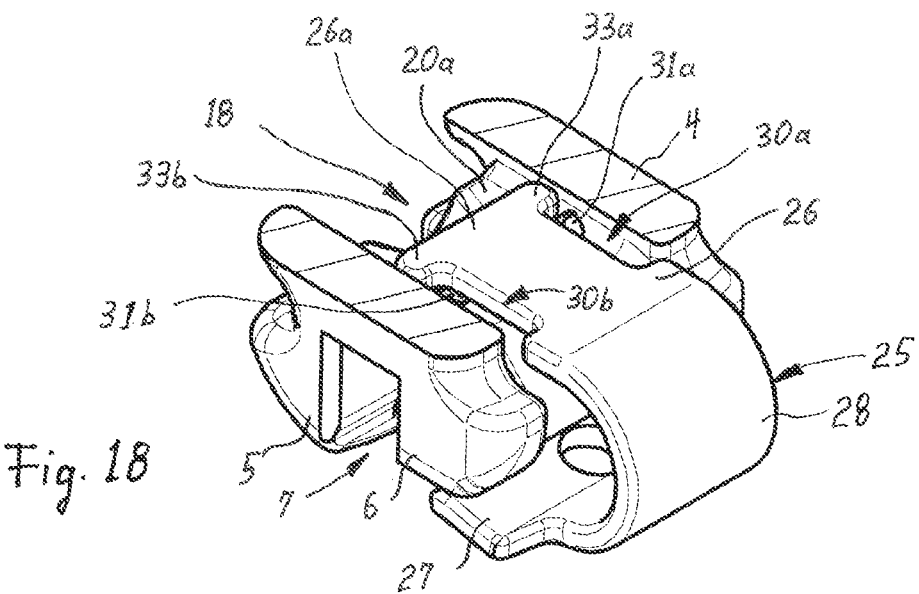
FIG. 18 is an oblique view of the bracket cut along the cut surface XVIII-XVIII in FIG. 17.
Figure 17:
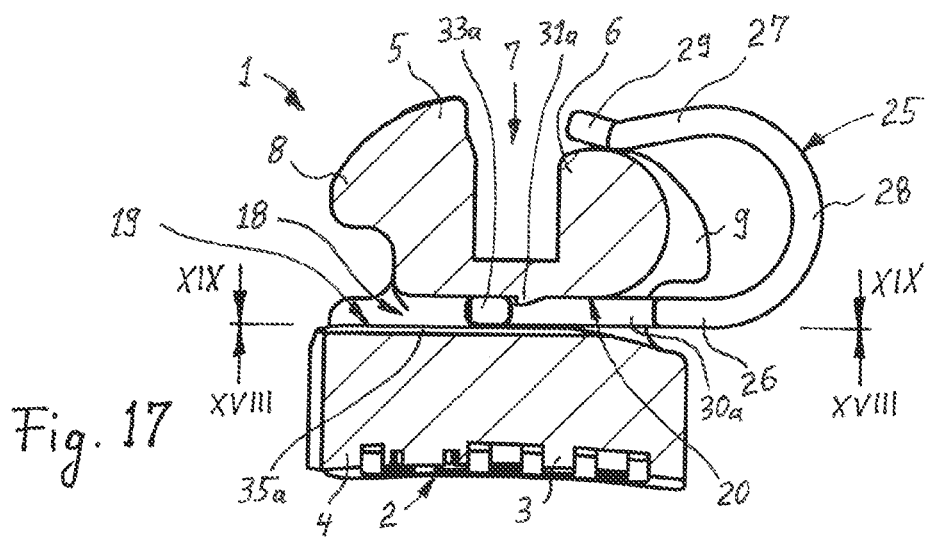
FIG. 17 is a view of the bracket cut along the cut surface XVII-XVII in FIG. 16.
Figure 16:
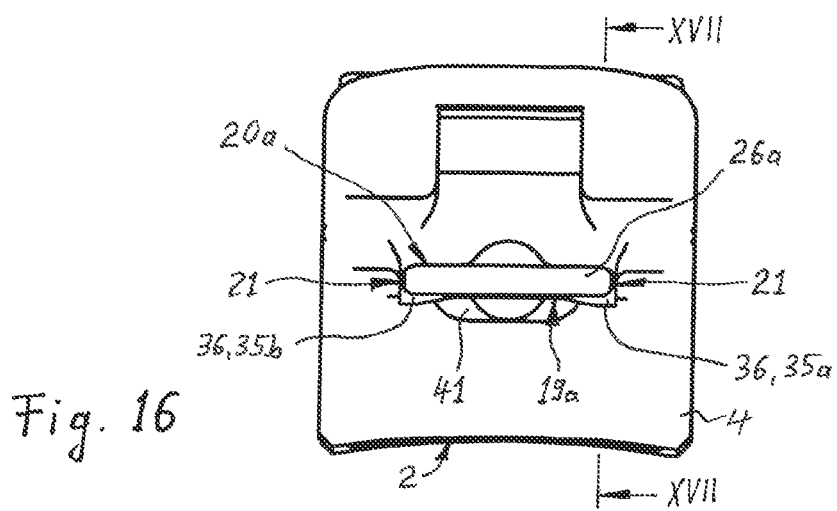
FIG. 16 is a view of the bracket in the direction of arrow XVI in FIG. 15.
Figure 19:
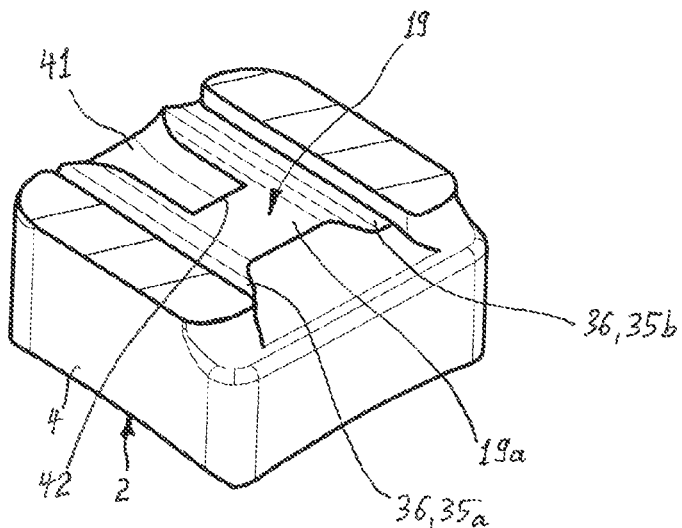
FIG. 19 is an oblique view of the bracket cut along the cut surface XIX-XIX in FIG. 17.
Figure 21:
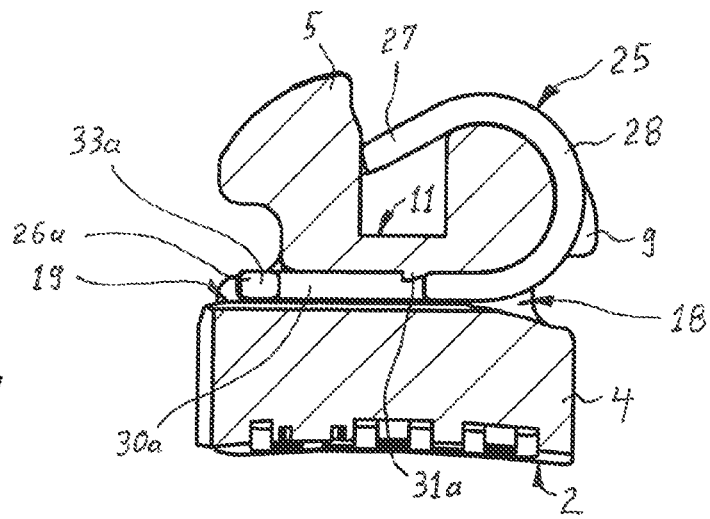
FIG. 21 shows the bracket according to FIG. 20 in a view corresponding to FIG. 17.
Figure 28:
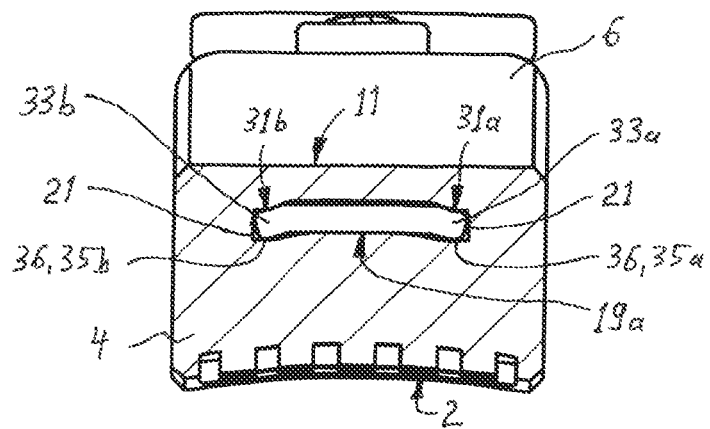
FIG. 28 is a view of the bracket cut along the cut surface XXVIII-XXVIII in FIG. 25.
Figure 24:
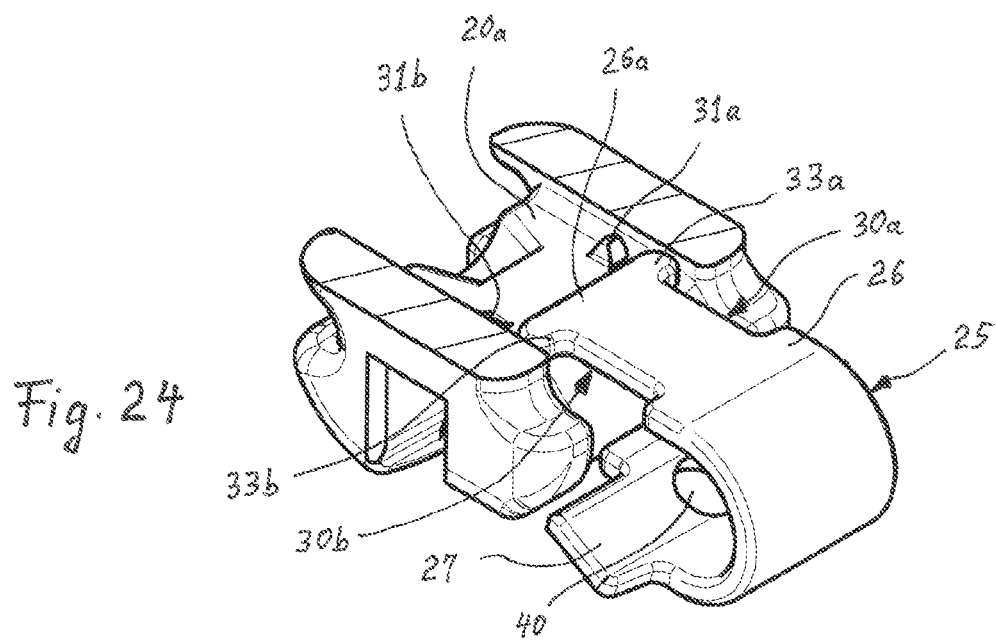
FIG. 24 shows the bracket according to FIG. 22 in a view corresponding to FIG. 18.
Figure 22:
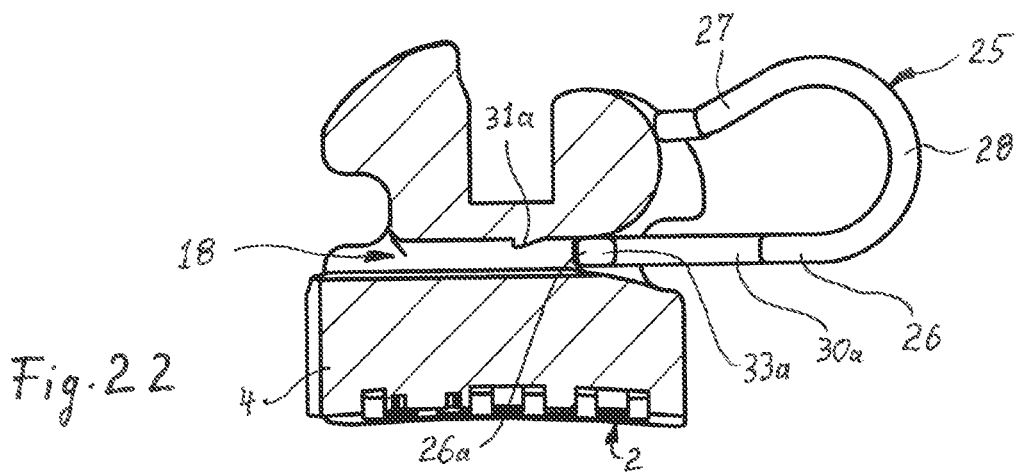
FIG. 22 shows the bracket of FIG. 17 in a view corresponding to the latter, wherein the clamp has not yet been inserted.
Figure 23:
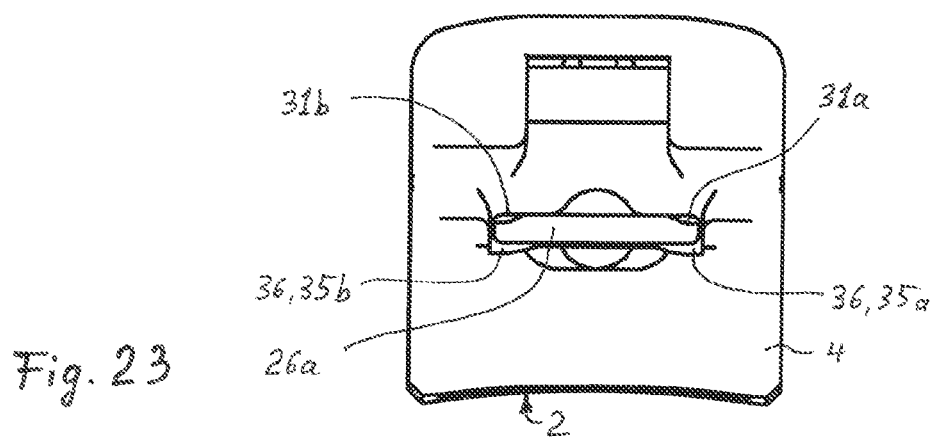
FIG. 23 shows the bracket according to FIG. 22 in a view corresponding to FIG. 16.
Figure 27:
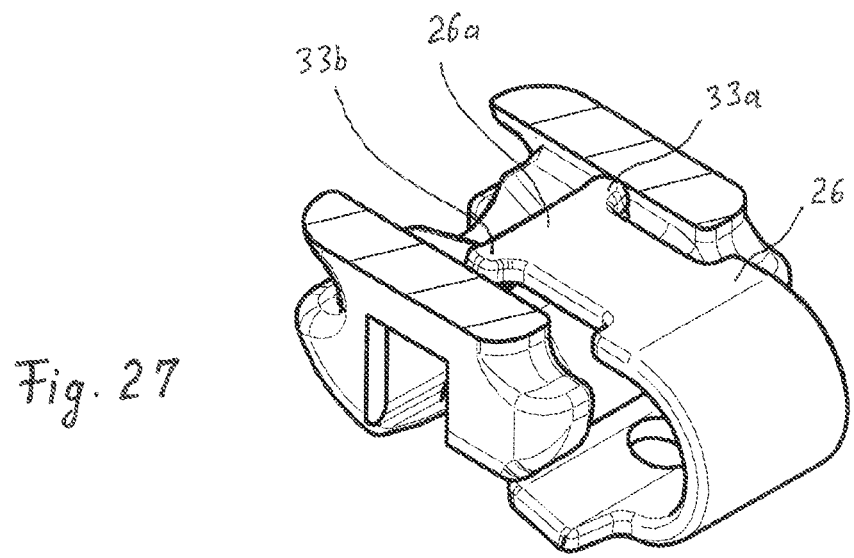
FIG. 27 shows the bracket according to FIG. 25 in a view corresponding to FIG. 18.
Figure 25:
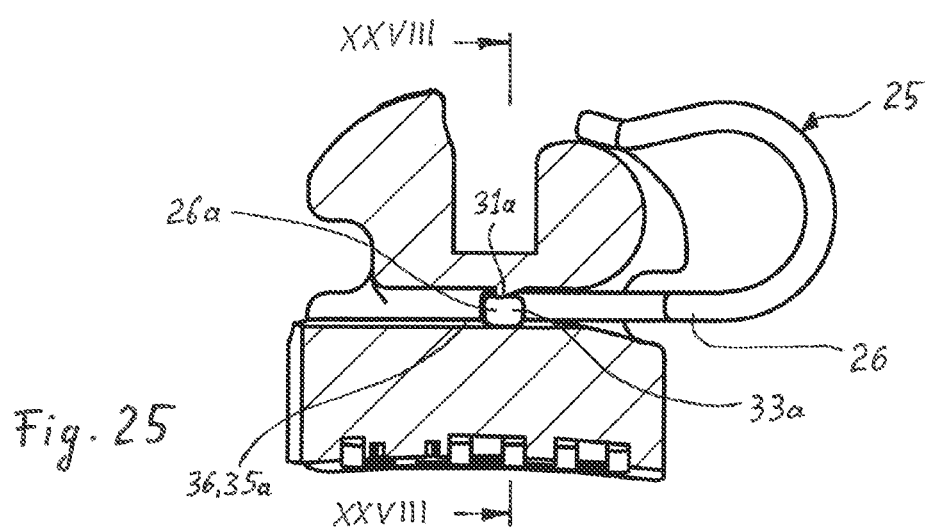
FIG. 25 shows the bracket on FIG. 17 in a view corresponding to the latter, wherein the clamp is partially inserted.
Figure 26:
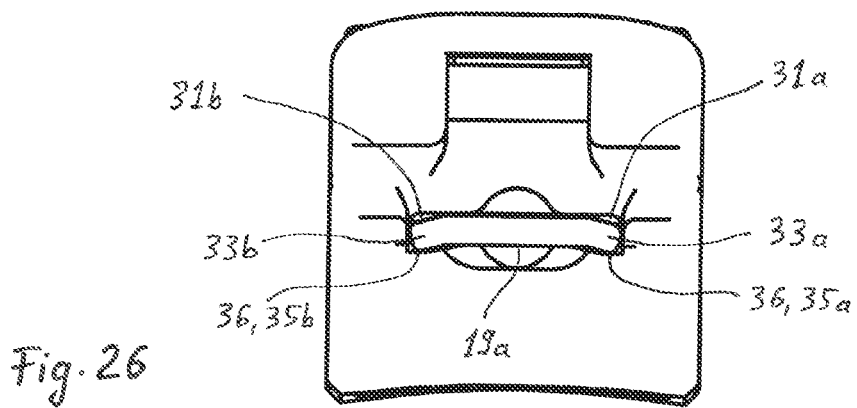
FIG. 26 shows the bracket according to FIG. 25 in a view corresponding to FIG. 16.
Figure 34:
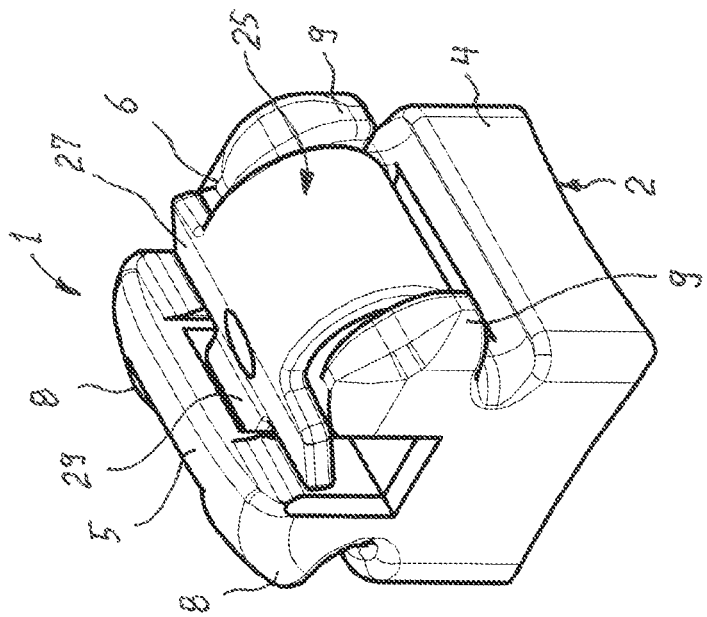
FIG. 34 shows the bracket of FIG. 29 in a view corresponding to the latter, wherein the clamp is in the closed position.
Figure 29:
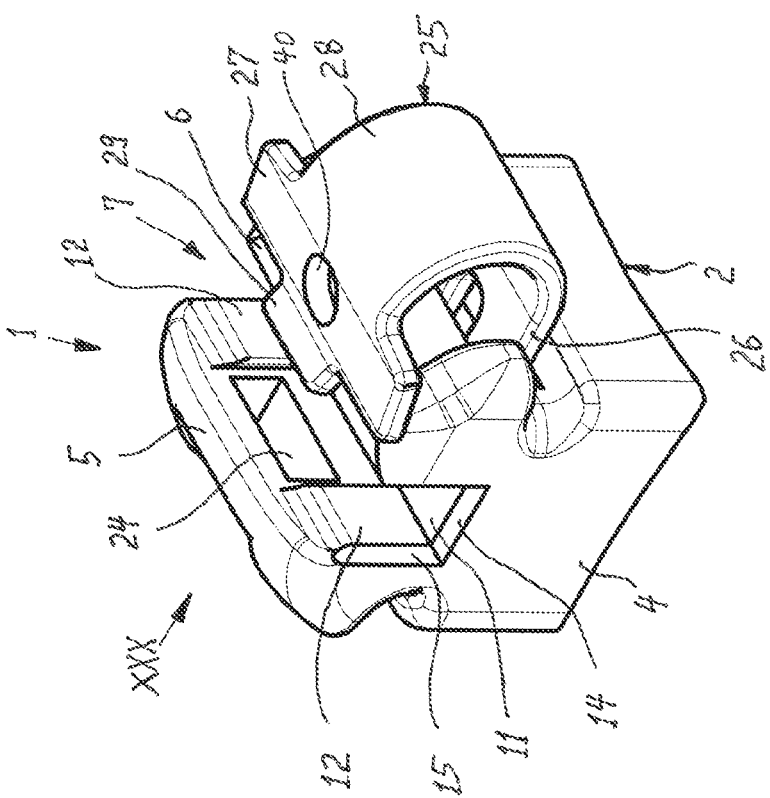
FIG. 29 is a perspective view of a third embodiment of the bracket according to the invention with a clamp in the open position.
Figure 32:
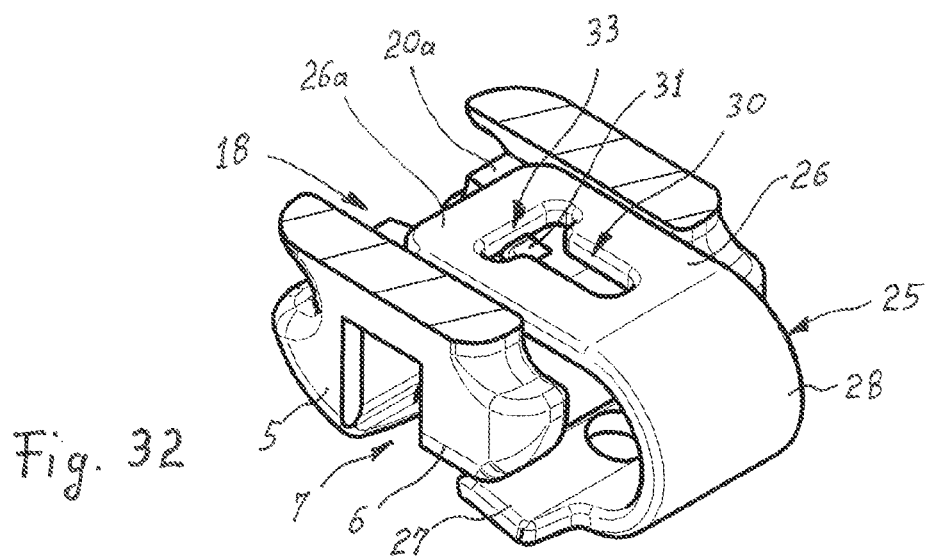
FIG. 32 is an oblique view of the bracket cut along the cut surface XXXII-XXXII in FIG. 31.
Figure 31:
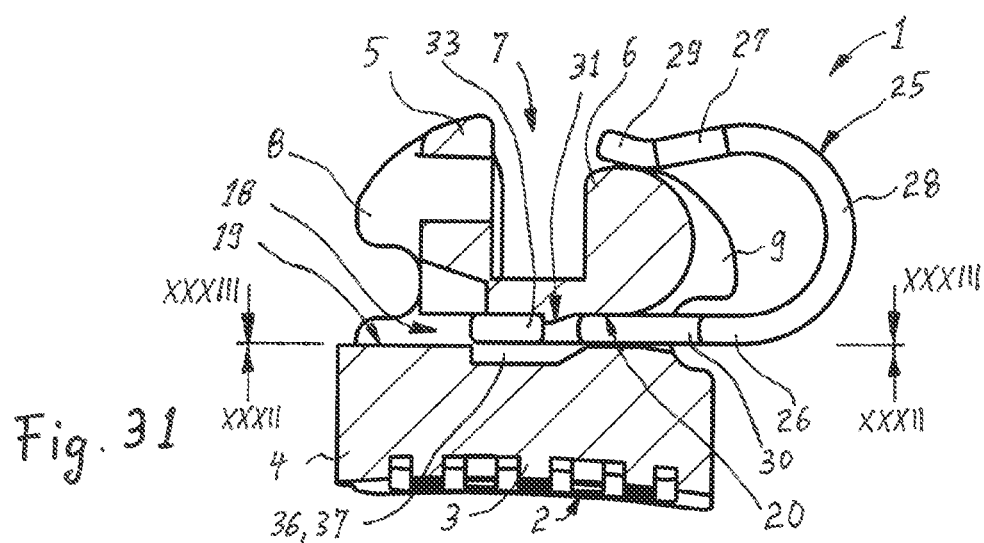
FIG. 31 is a view of the bracket cut along the cut surface XXXI-XXXI in FIG. 30.
Figure 30:
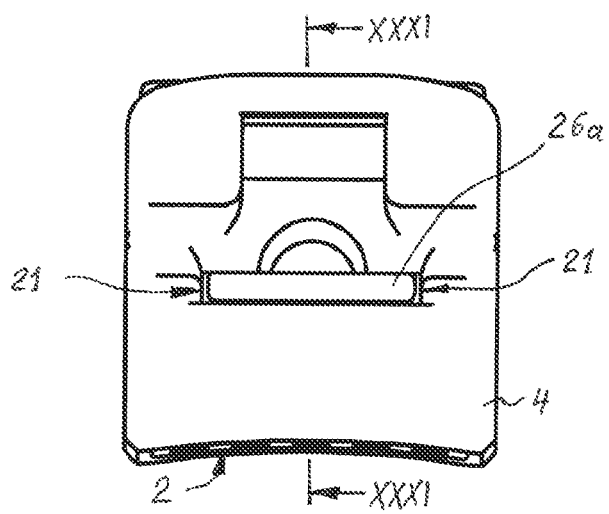
FIG. 30 is a view of the bracket in the direction of arrow XXX in FIG. 29.
Figure 33:
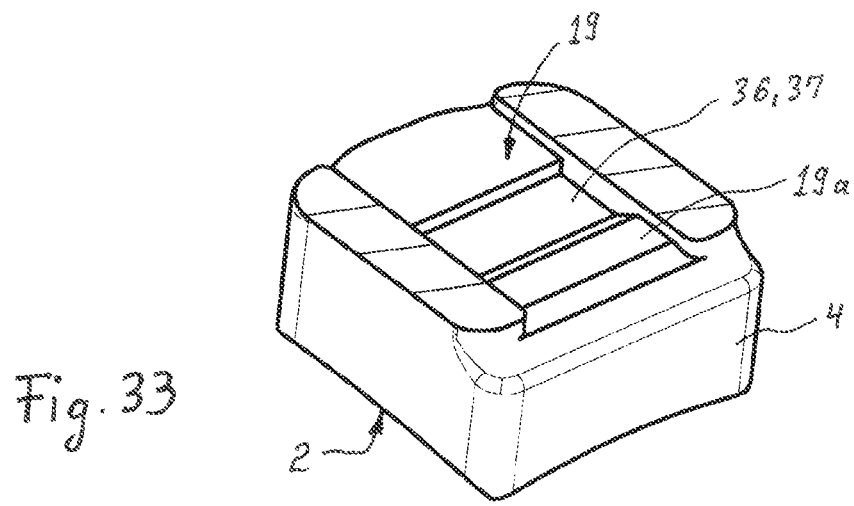
FIG. 33 is an oblique view of the bracket cut along the cut surface XXXIII-XXXIII in FIG. 31.
Figure 35:
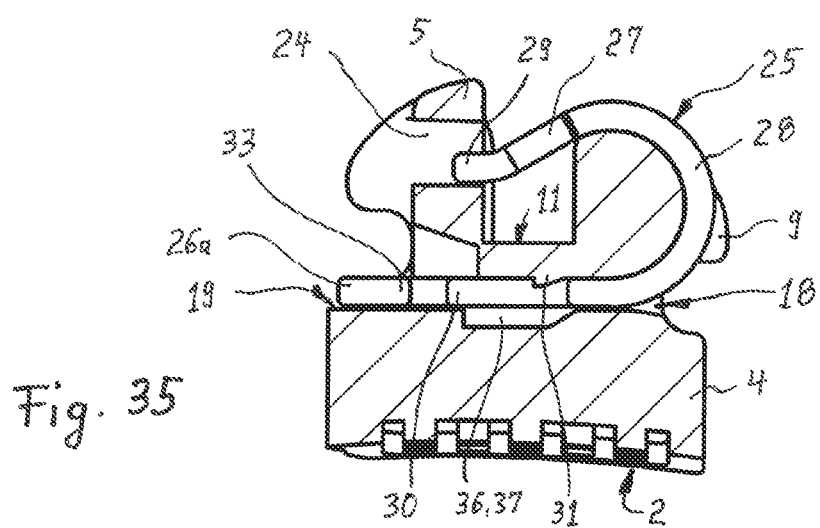
FIG. 35 shows the bracket according to FIG. 34 in a view corresponding to FIG. 31.
Figure 42:
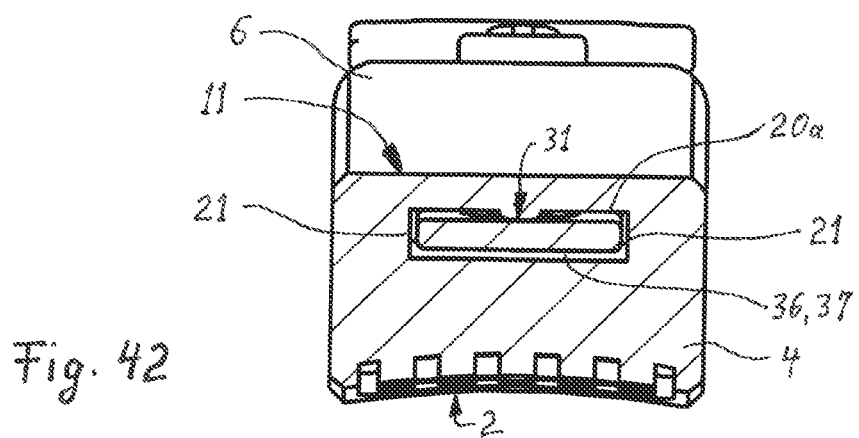
FIG. 42 is a view of the bracket cut along the cut surface XLII-XLII on FIG. 39.
Figure 38:
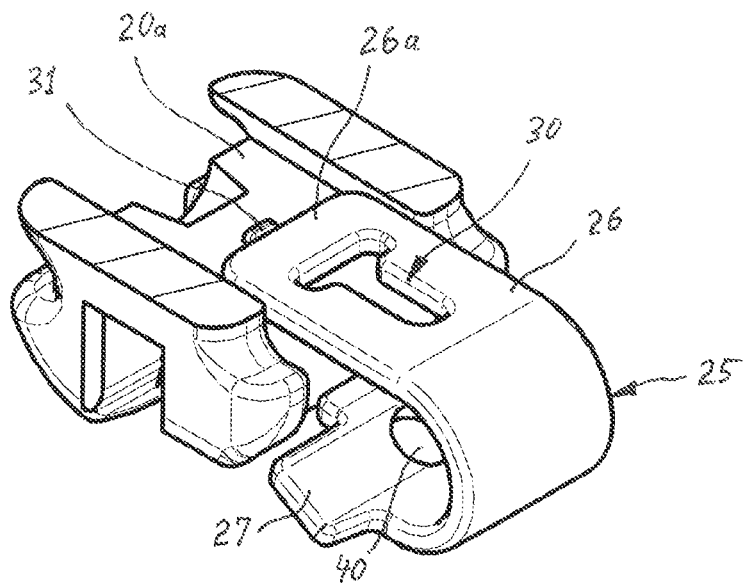
FIG. 38 shows the bracket according to FIG. 36 in a view corresponding to FIG. 32.
Figure 36:
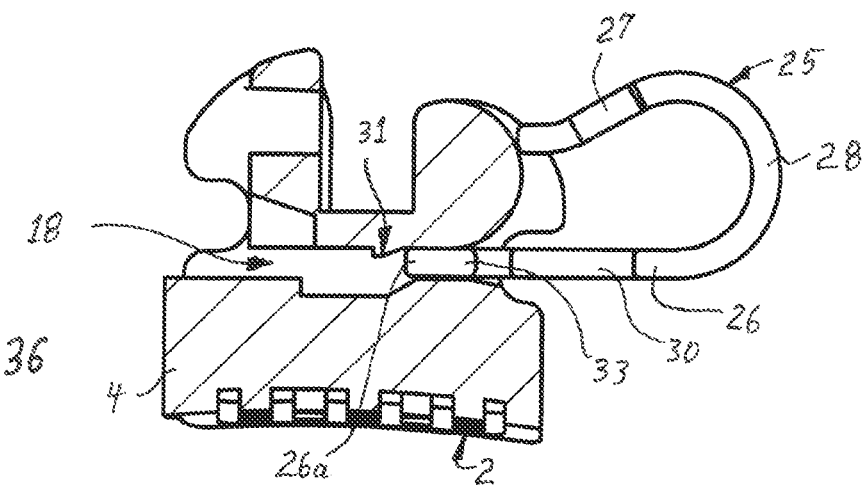
FIG. 36 shows the bracket of FIG. 31 in a view corresponding to the latter, wherein the clamp has not yet been inserted.
Figure 37:
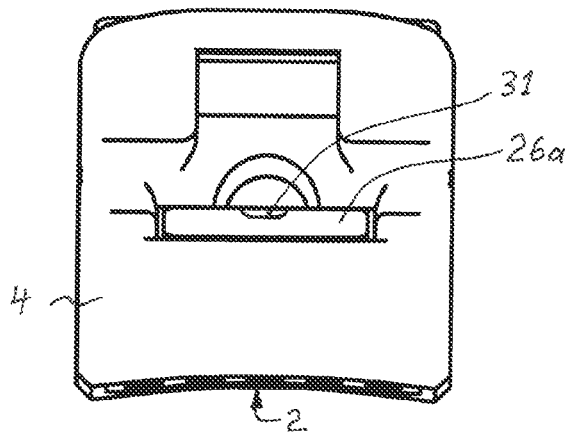
FIG. 37 shows the bracket according to FIG. 36 in a view corresponding to FIG. 30.
Figure 41:
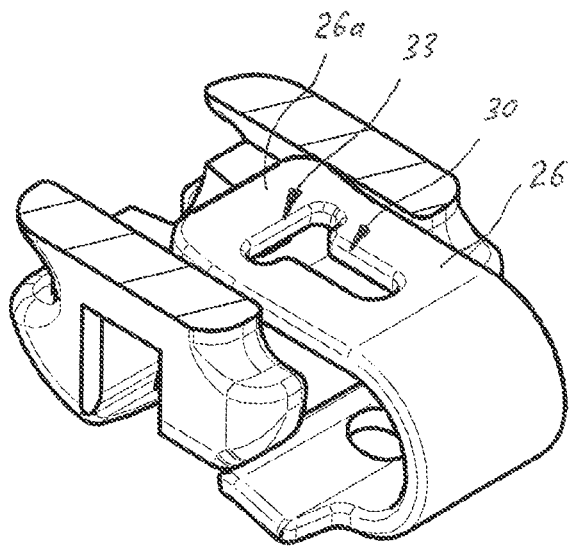
FIG. 41 shows the bracket according to FIG. 39 in a view corresponding to FIG. 32.
Figure 39:
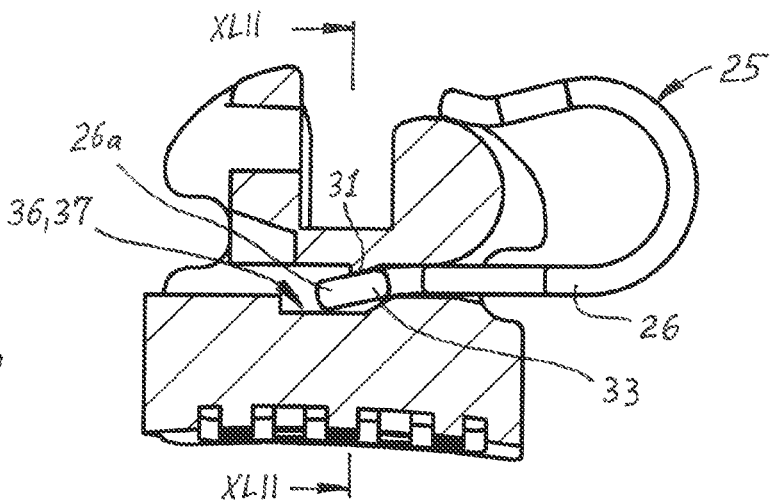
FIG. 39 shows the bracket of FIG. 31 in a view corresponding to the latter, wherein the clamp is partially inserted.
Figure 40:
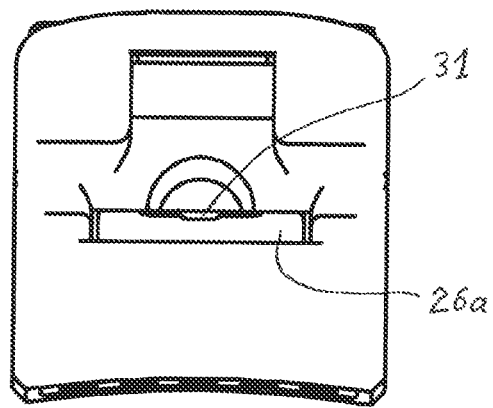
FIG. 40 shows the bracket according to FIG. 39 in a view corresponding to FIG. 30.

FIGS. 1 to 42 show three embodiments of a bracket 1 according to the invention. The bracket 1 according to the invention has a curved fastening side 2, whose curvature is approximated to the vestibular side of a tooth (not shown). Projections 3 arranged in rows are present on the fastening side 2. An adhesive can be applied to the fastening side, so as to adhesively bond the bracket 1 to the vestibular side of a tooth. The fastening side 2 thus comprises the lingual side of the bracket 1. In a bracket to be adhesively bonded to the lingual side of a tooth, the indications "lingual" and "labial" must be switched accordingly. The bracket 1 has a socket base 4 having a socket 4a, from which a gingival wall 5 and an occlusal wall proceed. The two walls 5 and 6 run parallel to each other, and are separated by a groove 7 that runs continuously along a straight line from distal to mesial, and is labially open. Two ligature wings 8 protruding in a gingival direction are provided on the gingival wall 5. Two ligature wings 9 protruding in an occlusal direction are provided on the occlusal wall 6. As a consequence, the orientation provided for the bracket on a tooth is as follows on FIG. 3 with respect to the directions: bottom lingual, top labial, right occlusal, left gingival and distal-mesial perpendicular to the drawing plane.

The groove 7 is designed to receive an archwire (not shown), which usually has a rectangular cross section and is not part of the bracket. By preloading the archwire, a torque can be exerted on the base 11 of the groove 7 and on the walls 5 and 6. To this end, the clear cross section of the groove 7 is generally rectangular. In the present case, the clear cross section is bordered by the base 11 of the groove 7 as well as by ribs 12 on the gingival wall 5, which serve to diminish the friction of the archwire in the groove 7. The base 11 extends continuously without interruption from mesial to distal, see FIGS. 14, 28 and 42. Provided at the ends of the groove 7 are rounded inclined surfaces 14 on the base 11, rounded inclined surfaces 15 on the gingival wall 5 and rounded inclined surfaces on the occlusal wall 6, which widen the entry of the groove 7, and likewise serve to diminish the friction for the archwire lying in the groove 7. This can be advantageous in particular given severely misaligned teeth, which require an especially irregular progression of the archwire.

A slit 18 runs underneath the base 11 of the groove 7 parallel to the base 11, and is bordered by a lingually situated surface 19 and a labially situated surface 20, as well as by two narrow side walls 21. The side walls 21 run parallel to each other, and extend between the lingually situated surface 19 and the labially situated surface 20. The slit 18 extends continuously through the socket base 4, and is not connected with the groove 7.

The bracket 1 also comprises a clamp 25 made out of a spring material. It has a first clamp leg 26 that runs in a straight line and a second clamp leg 27 that is shorter than the first clamp leg 26 and runs approximately in a straight line. The first clamp leg 26 is the lingual leg, and the second clamp leg 27 is the labial leg. The two clamp legs 26, 27 are connected by a section that runs in an approximately circular arc, which is referred to as the clamp bend 28. In the case depicted, the clamp bend 28 forms an occlusally arranged section of the clamp 25. The latter is exactly as wide as the first clamp leg 26, which fits into the slit 18 with little play. The second clamp leg 27 widens to approximately the length of the groove 7. It does not run parallel, but rather at an acute angle to the first clamp leg 26, which it approaches from the clamp bend 28. The gingival end of the second clamp leg 27 has a gingivally extending extension 29, which is angled in a labial direction. The extension 29 is narrower than the second clamp leg 27, and narrower than the first clamp leg 26; it fits with little play in a cutout 24 arranged in the gingival wall 5. The clamp 25 is connected with the bracket 1 by introducing the clamp leg 26 from an occlusal direction into the slit 18, see FIGS. 8, 22 and 36, and pushing it forward in a gingival direction until in the closed position of the clamp 25, see FIGS. 7, 21 and 35. For opening purposes, the clamp 25 is pushed back until it is in its open position, see FIGS. 3, 17 and 31. Given a bracket to be adhesively bonded to a tooth in the opposite direction, the clamp bend 28 can form a gingivally situated section of the clamp 25, and the indications "occlusal" and "gingival" are to be switched accordingly.

In the first embodiment of the bracket 1 shown in FIGS. 1 to 14, the first clamp leg 26 has an oblong recess 30. The recess 30 is designed as an oblong hole, and centrally arranged in the first clamp leg 26. A projection 31 that proceeds from the labially situated surface 20 of the slit 18 protrudes lingually into the recess 30. The labially situated surface 20 is designed as a flat guiding surface 20a for the first clamp leg 26. The projection 31 is shaped like a latching lug. The (occlusal) side of the projection 31 facing the clamp bend (28) runs inclined at an angle of roughly 20° to the guiding surface 20a. The (gingival) side of the projection 31 facing away from the clamp bend (28) is inclined more strongly toward the guiding surface 20a than the side facing the clamp bend (28). The projection 31 is molded in one piece on the socket 4. The (gingival) end of the recess 30 facing away from the clamp bend (28) is bordered by a stop 33, which is formed by the mesially to distally running web at the free (gingival) end 26a of the first clamp leg 26. The lingually situated surface 19 of the slit 18 contains two flat guiding surfaces 19a and 19b for the first clamp leg 26, between which a channel 35 is arranged. The guiding surfaces 19a, 19b run parallel to the guiding surface 20a. The guiding surfaces 19a, 19b and the channel 35 extend from gingival to occlusal over the entire length of the slit 18. When starting to introduce the clamp 5 into the slit 18, the free end 26a of the first clamp leg 26 sits before the projection 31, see FIGS. 8 to 10. When the stop 33 reaches the projection 31 while continuing to insert the first clamp leg 26 into the slit 18, the first clamp leg 26 is resiliently deformed in the lingual direction with the stop 33, see in particular FIGS. 11 to 14. The channel 35 in the lingually situated surface 19 forms an escape space 36 in the surface 19 lying opposite the projection 31. The first clamp leg 26 with the stop 33 can thus escape into the escape space 36 when the stop 33 slides over the projection 31 while inserting the clamp 25. In the area of the stop 33, the guiding surfaces 19a, 19b and the projection 31 here bend the first clamp leg 26 around a straight line, which runs along the longitudinal direction of the first clamp leg 26 in the gingival-occlusal direction, see in particular FIGS. 12 and 14. Once the stop 33 has been pushed over the projection 31, the first clamp leg 26 springs back into its flat initial shape, see FIGS. 2 to 4. If the first clamp leg 26 is pushed further in the direction of the closed position, the projection 31 does not impede the movement, since the projection 31 finds room in the recess 30. If the first clamp leg 26 has been completely pushed into the slit 18, the clamp 25 is in its closed position, see FIGS. 6 and 7. For moving the clamp 25 from the closed position into the open position, the second clamp leg 27 has a hole 40, which a pin-shaped tool (not shown) can engage. In addition, a positioning aid 41 for a tool (not shown) is provided before the free end 26a of the first clamp leg 26, with which the clamp 25 can be moved from the closed position into the open position by pressing against the free end 26a of its first clamp leg 26. In each position of the clamp 25, in particular in its closed position (see FIG. 7), the surface 19 that borders the slit 18 and is situated on the side of the first clamp leg 26 facing away from the groove 7 protrudes over the free end 26a of the first clamp leg 26. In order to move the clamp 25 out of its closed position (see FIG. 7) into its open position (see FIG. 3), a tool (not shown) is taken to hand, for example a scaler, and applied to the free end 26a of the first clamp leg 26. This position can be palpated without having to see it, because the lingually situated surface 19 extends so far in the gingival direction as to protrude over the free end 26a of the first clamp leg 26. In addition, a channel 41 extending until under the first clamp leg 26 is located in the lingually situated surface 19, proceeding from its gingival end. The channel 41 narrows in the gingival to occlusal direction, and ends at a stop 42. The channel 41 serves as a positioning aid for the tool (not shown), with which the channel 41 can be palpated. Once the recess 41 has been palpated, the tip of the tool is used to move the clamp 25 in the gingival to occlusal direction. The tip of the tool here continues to be guided in the correct direction by the channel 41. The sliding movement ends when the stop 33 hits the projection 31, see FIG. 3. The clamp 25 is then in its open position. In this open position, the second clamp leg 27 has a resting position on the occlusal wall 6, in which it opens up access to the groove 7 from a labial direction.

In the second embodiment of the bracket 1 shown in FIGS. 15 to 28, the mesial edge and distal edge of the first clamp leg 26 each have a recess 30a, 30b. A projection 31a proceeding from the labially situated surface 20 protrudes into the recess 30a. A projection 31b proceeding from the labially situated surface 20 protrudes into the recess 30b. An escape space 36 is allocated in the list 18 opposite the projection 31a, designed like a channel 35a, and extends from gingival to occlusal over the entire length of the slit 18. An escape space 36 is provided in the slit 18 opposite the projection 31b. The escape space 36 is formed as a channel 35b that extends from gingival to occlusal over the entire length of the slit 18. The labially situated surface 20 of the slit is designed as a flat guiding surface 20a, from which the two projections 31a, 31b proceed. The lingually situated surface 19 of the slit 18 contains a flat guiding surface 19a for the first clamp leg 26, which is arranged between the two channels 35a and 35b. As in the first embodiment, during the insertion of the first clamp leg 26 into the slit 18, the first clamp leg 26 with the two stops 33a and 33b resiliently escapes into the respective escape space 36a and 36b (see FIGS. 25 to 28) while the stops 33a, 33b slide over the projections 31a and 31b during insertion of the clamp 25 into the slit 18. In the area of the stops 33a, 33b, the projections 31a and 31b and the guiding surfaces 19a here bend the first clamp leg 26 around a straight line, which runs along the longitudinal direction of the first clamp leg 26 in the gingival-occlusal direction, see FIGS. 26 and 28. Here as well, the bend of the first clamp leg 25 again reverses once the stops 33a, 33b have been pushed over the projections 31a and 31b, see FIGS. 16 to 18. When the clamp 25 is moved between the open position (see FIG. 17) and the closed position (see FIG. 21), the projections 31a, 31b protrude into the recesses 30a, 30b, and do not impede the movement. In order to move the clamp 25 from the closed position into the open position, the second clamp leg 27 has a hole 40, into which a pin-shaped tool (not shown) can engage. The functional principle of the second embodiment otherwise corresponds to that of the first embodiment, so that reference is made thereto so as to avoid repetition.

In the third embodiment of the bracket 1 according to the invention shown on FIGS. 29 to 42, the first clamp leg 26 has an oblong recess 30 that is T-shaped in design. A projection 31 proceeding from the labially situated surface 20 lingually protrudes into the latter. The labially situated surface 20 is designed as a flat guiding surface 20a. The lingually situated surface 19 contains a flat guiding surface 19a. A pocket 37 is formed in the lingually situated surface 19 as an escape space 36. The pocket 37 extends over the entire width of the slit 18, see FIG. 33. As in the first exemplary embodiment, during the insertion of the first clamp leg 26 into the slit 18, the first clamp leg 26 with the stop 33 resiliently escapes into the escape space 36 (see FIGS. 39 to 42) while the stop 30 slides over the projection 31 during insertion of the clamp 25 into the slit 18. In the area of the stop 33, the projection 31 here bends the first clamp leg around a straight line, which runs transverse to the longitudinal direction of the first clamp leg 26, i.e., in the mesial-distal direction. As in the first embodiment, the bend of the first clamp leg again reverses once the stop 33 has been pushed over the projection 31, see FIGS. 30 to 32. The functional principle of the third exemplary embodiment otherwise corresponds to that of the first exemplary embodiment, so that reference is made thereto so as to avoid repetition.

REFERENCE LIST

1 Bracket
2 Fastening side
3 Projections
4 Socket base
5 Gingival wall
6 Occlusal wall
7 Groove
8 Gingival ligature wing
9 Occlusal ligature wing
10 Base of 7
11 Ribs on 5
14 Inclined surfaces on 11
15 Inclined surfaces on 5
18 Slit
19 Lingually situated surface
19a Guiding surface
19b Guiding surface
20 Labially situated surface
20a Guiding surface
21 Side walls
24 Cutout
25 Clamp
26 First clamp leg
26a Free end
27 Second clamp leg
28 Clamp bend
29 Extension from 27
30 Recess
30a Recess
30b Recess
31 Projection
31a Projection
31b Projection
33 Stop
33a Stop
33b Stop
35 Channel
35a Channel
35b Channel
36 Escape space
37 Pocket
40 Hole in 27
41 Channel (positioning aid)
42 Stop

What is claimed is:

1. A self-ligating bracket for orthodontics, comprising:
a base having a socket disposed on a fastening side;
an occlusal wall that extends from the base;
a gingival wall that extends from the base;
a groove disposed in the base, the groove separating the occlusal wall and the gingival wall from each other, and extending continuously in the mesial to distal direction; the fastening side facing away from the groove, the fastening side configured for adhesively bonding the socket of the base to a lingual or vestibular surface of a tooth;
a slit disposed in the base, the slit extending in the gingival to occlusal direction, and the slit having a lingually situated surface opposite a labially situated surface; and
a resilient clamp, which has a first clamp leg and a second clamp leg that are connected with each other by an occlusally or gingivally arranged clamp bend;
wherein the first clamp leg is inserted in the slit between the lingually situated surface and the labially situated surface, and can be moved therein in a gingival-occlusal direction between a closed position and an open position of the clamp;
wherein the first clamp leg is set up in such a way as to prevent an unintended loss of the clamp;
wherein the first clamp leg has a recess, into which protrudes a projection that extends from the lingually or labially situated surface of the slit;
wherein the recess is bordered on its end facing away from the clamp bend by a stop, which abuts the projection in the open position of the clamp and limits a further movement of the clamp; and
wherein the lingually or labially situated surface situated opposite the projection has a first and a second flat guiding surface between which a channel is arranged, where the channel forms an escape space inside of the slit, into which the first clamp leg escapes with the stop under a resilient deformation when the stop slides over the projection during insertion of the clamp into the slit.

2. The bracket according to claim 1, wherein the lingually or labially situated surface from which the projection proceeds, contains a third flat guiding surface for the first clamp leg, wherein the first and the second flat guiding surfaces face the third flat guiding surface, including a first side wall disposed perpendicular to and connecting the first flat guiding surface and the third flat guiding surface, and including a second side wall disposed perpendicular to and connecting the second flat guiding surface and the third flat guiding surface, wherein the first side wall faces the second side wall.

3. The bracket according to claim 2, wherein the side of the projection facing the clamp bend runs inclined to the third flat guiding surface.

4. The bracket according to claim 3, wherein the side of the projection facing the clamp bend runs inclined to the third flat guiding surface at an angle of 15° to 25°.

5. The bracket according to claim 1, wherein the first clamp leg extends in a plane, and is bent around a line running along this plane when it yields to the projection under a resilient deformation during insertion of the clamp into the slit.

6. The bracket according to claim 1, wherein the recess is a central recess.

7. The bracket according to claim 6, wherein the central recess is an oblong-shaped through hole.

8. The bracket according to claim 6, wherein the channel extends from the gingival to occlusal wall.

9. The bracket according to claim 8, wherein the channel extends from the gingival to occlusal wall over the entire length of the slit.

10. The bracket according to claim 1, wherein the slit extends continuously through the base.

11. The bracket according to claim 10, wherein the lingually or labially situated surface of the slit lies on the side of the first clamp leg facing away from the groove, and protrudes over the free end of the first clamp leg in each position of the clamp, and in which a positioning aid for a tool is provided at and/or before the free end of the first clamp leg, with which the clamp can be moved from the closed position into the open position by pressing against the free end of its first clamp leg.

12. The bracket according to claim 11, wherein a second channel extending from gingival to occlusal direction is provided in the channel of the slit for the positioning aid, which ends at a stop that is covered by an end of the first clamp leg when the clamp is in its closed position.

13. The bracket according to claim 1, wherein the second clamp leg has a hole.

14. The bracket according to claim 1, wherein the base, the occlusal wall, the gingival wall, the groove, the slit, the lingually situated surface, the labially situated surface, the projection and the escape space is molded in one piece as a bracket body.

15. A self-ligating bracket for orthodontics, comprising:
a base having a socket disposed on a fastening side;
an occlusal wall that extends from the base;
a gingival wall that extends from the base;
a groove, which separates the occlusal wall and the gingival wall from each other, and extends continuously in the mesial to distal direction;
the fastening side facing away from the groove, the fastening side configured for adhesively bonding the socket of the base to a lingual or vestibular surface of a tooth;
a slit, which extends in the gingival to occlusal direction, the slit having a lingually situated surface opposite a labially situated surface; and
a resilient clamp, which has a first clamp leg and a second clamp leg that are connected with each other by an occlusally or gingivally arranged clamp bend;
wherein the first clamp leg is inserted in the slit between the lingually situated surface and the labially situated surface, and can be moved therein in a gingival-occlusal direction between a closed position and an open position of the clamp;
wherein the first clamp leg is set up in such a way as to prevent an unintended loss of the clamp;
wherein the first clamp leg has a recess, into which protrudes a projection that extends from the lingually or labially situated surface of the slit;
wherein the recess is bordered on its end facing away from the clamp bend by a stop, which abuts the projection in the open position of the clamp and limits a further movement of the clamp;
wherein the lingually or labially situated surface situated opposite the projection has a first and a second flat guiding surface between which a channel is arranged, where the channel forms an escape space inside of the slit, into which the first clamp leg escapes with the stop under a resilient deformation when the stop slides over the projection during insertion of the clamp into the slit;
wherein the lingually or labially situated surface of the slit from which the projection proceeds, contains a third flat guiding surface for the first clamp leg, the first and the second flat guiding surfaces facing the third flat guiding surface;
wherein the side of the projection facing the clamp bend runs inclined to the third flat guiding surface; and
wherein the escape space is formed by the channel in the surface of the slit situated opposite the projection, wherein the channel extends in the gingival to occlusal direction.

16. The bracket according to claim 15, wherein the slit is delimited by the third flat guiding surface, a first side wall, the first flat guiding surface, the channel, the second flat guiding surface, and a second side wall, wherein the first and second side walls face one another and are disposed perpendicular to the first, second and third flat guiding surfaces.

* * * * *